United States Patent
Poitras et al.

[15] 3,652,053
[45] Mar. 28, 1972

[54] UNI-DIRECTIONALLY OPERATED VALVE APPARATUS

[72] Inventors: Edward J. Poitras, Holliston; Edwin W. Wlodyka, Ashland, both of Mass.

[73] Assignee: Highland Laboratories, Ashland, Mass.

[22] Filed: Feb. 9, 1970

[21] Appl. No.: 9,596

[52] U.S. Cl..................251/38, 251/74, 251/322, 137/605
[51] Int. Cl.....................................F16k 31/385
[58] Field of Search...............251/38, 39, 66, 74, 263, 321, 251/323, 322

[56] References Cited

UNITED STATES PATENTS 3,220,695   11/1965   Downey et al. ..................251/74 X 3,439,896   4/1969   Worst ..................251/38

FOREIGN PATENTS OR APPLICATIONS 1,258,453   3/1961   France..................251/38
973,914   11/1964   Great Britain..................251/38
982,160   2/1965   Great Britain..................251/321

*Primary Examiner*—Robert G. Nilson
*Attorney*—John E. Toupal

[57] ABSTRACT

Disclosed is a valve that alternately prevents and allows fluid flow in response to sequential uni-directional movements of a reciprocal valve operator. Alternate inward movements of the valve operator induce seating and unseating relative movements between a valve head and a valve seat to open and close a passage between inlet and outlet openings. A spring member returns the operator to an outward neutral position after a pair of sequential inward control movements.

7 Claims, 2 Drawing Figures

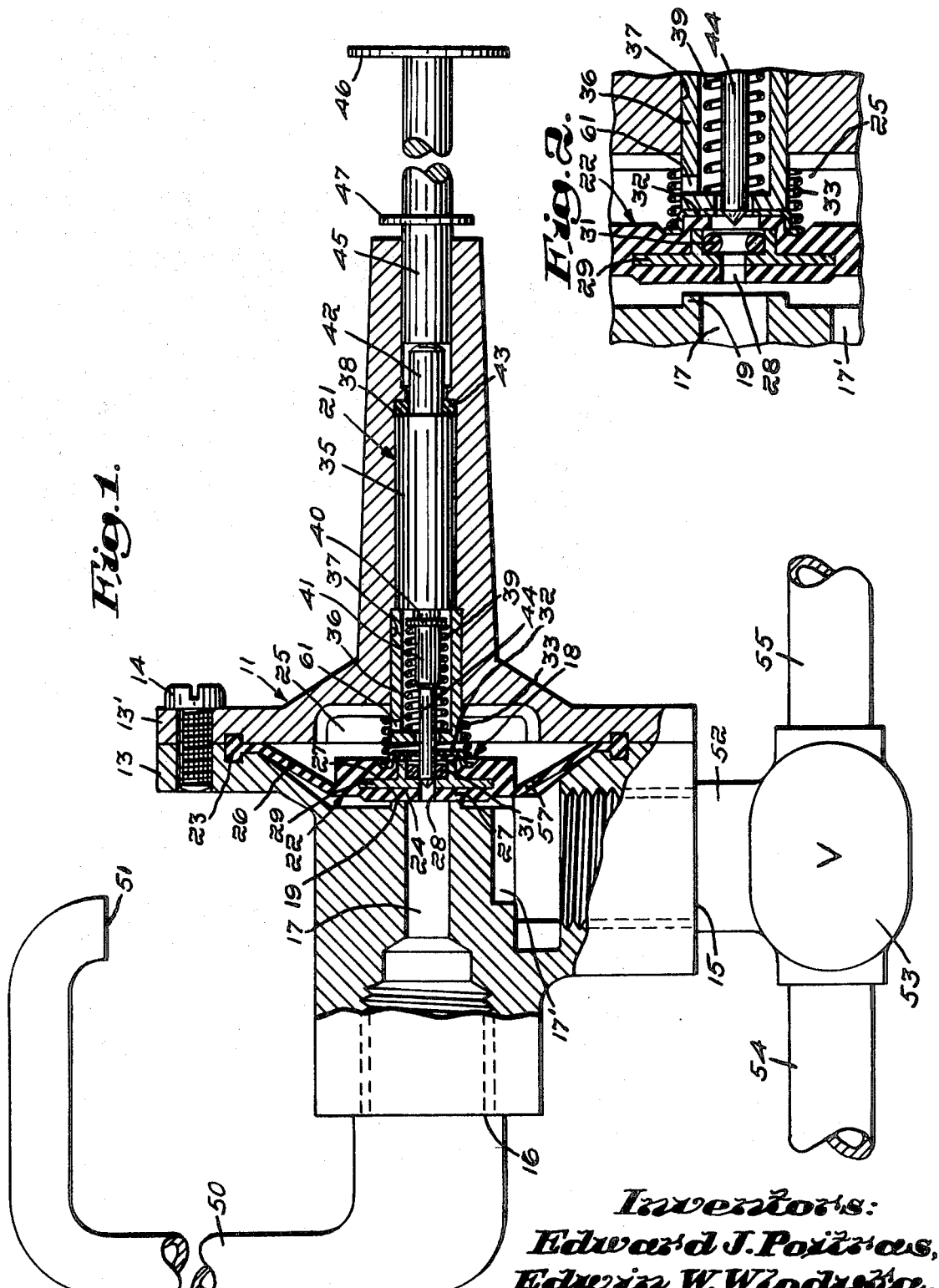

UNI-DIRECTIONALLY OPERATED VALVE APPARATUS

BACKGROUND OF THE INVENTION

The present invention relates generally to a fluid flow control system and, more particularly, to a valve suitable for operation by a user's thigh or knee.

In certain applications manual control of fluid flow is required but physical contact between a control device and an operator's hands is undesirable. The hospital washrooms used by surgeons and attendants are prime examples of such applications. Although manual control of water flow is desirable for required hand washing procedures, the possibility of contamination renders physical contact between the control device and the user's hands unsuitable.

The object of this invention, therefore, is to provide a fluid flow control system that can be easily and selectively operated without the use of hands.

CHARACTERIZATION OF THE INVENTION

The invention is characterized by the provision of a valve that alternately prevents and allows fluid flow in response to sequential uni-directional movements of a reciprocal valve operator. Alternating inward movements of the valve operator induce seating and unseating relative movements between a valve head and a valve seat to open and close a passage providing fluid communication between inlet and outlet openings. The operator is returned to an outward neutral position after a pair of sequential inward control movements. Thus, both opening and closing of the valve are effected by alternate operator movements of the same sense. Because of this uni-directional on-off control motion, the valve is uniquely suited for manual operation by parts of the anatomy such as the thigh, knee or foot in fluid flow control applications in which hand operation is undesirable.

According to a featured embodiment of the invention, a ball point pen type ejector-retractor mechanism is employed to trigger flexible diaphragm movements ultimately produced by fluid pressure available at the valve's inlet opening. The diaphragm includes inner and outer portions that seal an internal valve chamber from, respectively, the outlet and inlet openings and an annular mid-portion that seats against the valve seat to close the passage between those openings. An orifice in the outer diaphragm portion normally maintains inlet pressure within the internal valve chamber and the force produced by this pressure retains the mid-diaphragm portion seated and the valve closed. However, inward movement of the valve operator withdraws a valve stem from a larger orifice in the inner diaphragm portion thereby reducing the internal chamber pressure and allowing inlet fluid pressure to unseat the diaphragm and allow fluid flow between the inlet and the outlet openings. A subsequent inward movement of the valve operator repositions the valve stem within the inner orifice. Consequently, inlet fluid pressure is again established within the internal valve chamber resulting in reseating of the diaphragm and elimination of fluid flow through the valve passage. Because inlet fluid pressure is utilized as the primary force for valve operation, the force required to operate the valve actuator is small and a relatively simple retractor-ejector mechanism can be used.

Another feature of the invention is the use of an elongated valve stem of uniform cross section that substantially conforms in size to the minimum cross section of the orifice in the inner diaphragm portion. Preferably, the minimum orifice cross section is provided by an inserted O-ring gasket. By creating an annular seal around the outer surface of a longitudinally uniform valve stem, the rectilinear valve stem motion required to create a fluid-tight seal is rendered less critical and the operational tolerances required of the retractor-ejector mechanism are lessened.

Still another feature of the invention entails the use of a thermostatically controlled mixing valve having an outlet connected for fluid communication with the inlet opening of the above-described valve. By connecting the inlets of the mixing valve to suitable sources of hot and cold water, alternate movements of the control valve's actuator result in water flow of a desired temperature from the valve's outlet opening.

DESCRIPTION OF THE DRAWINGS

These and other features and objects of the invention will become more apparent upon a perusal of the following description taken in conjunction with the accompanying drawings wherein:

FIG. 1 is a view partly in cross section illustrating a preferred embodiment of the invention; and FIG. 2 is a partial cross-sectional view of the FIG. 1 embodiment shown in a different operating position.

DESCRIPTION OF THE PREFERRED EMBODIMENT

Shown in FIG. 1 is an on-off valve 11 including valve body portions 12 and 12' with mating flanges 13 and 13' attached by circumferentially distributed screws 14. The valve body portion 12 defines inlet 15 and outlet 16 openings joined by passages 17 and 17'. Retained between the body portion 12 and 12' is a valve head assembly 18 that is operatively associated with a valve seat 19 formed by the body portion 12. An actuator assembly 21 is accommodated by a central bore in the body portion 12'.

The head assembly 18 primarily comprises a flexible rubber diaphragm 22 having a flared peripheral edge 23 retained within annular grooves in the internal faces of mating flanges 13 and 13'. Included within the body of the flexible diaphragm 22 is a central portion 24 that separates the outlet opening 16 from an internal valve chamber 25 formed by internal recesses in the body portions 12 and 12'. Also included is an annular outer diaphragm portion 26 that separates the inlet opening 15 from the internal chamber 25 and an annular intermediate portion 27 that seats against the valve seat 19. A central orifice 28 extends through the inner diaphragm portion 24 and through a strengthening disc 29 embedded therein. Axially disposed within the orifice 29 is an O-ring gasket 31 that is rigidly retained in a cup formed by the strengthening disc 29. The O-ring 31 is further retained by a centrally apertured retaining ring 32. A compression spring 33 extends between an inner surface of the body portion 12' and an annular peripheral lip on the retaining ring 32.

A cylindrical body 35 of the actuator assembly 21 is secured between a retaining cylinder 36 press fitted into an internal bore 37 in the body portion 12' and an internal shoulder thereof. Extending axially from opposite ends of the actuator body 35 are a valve stem 41 and an operating rod 42 that extends through an O-ring gasket 43. A compression spring 39 extends between an annular reentrant portion on the retaining cylinder 36 and an outwardly extending disc 40 on the valve stem 41. The valve stem 41 includes an elongated portion 44 of uniform cross-section slightly larger than the internal dimensions of the O-ring gasket 31 so as to provide a fluid seal in the position shown in FIG. 1. Engaging the operating rod 42 is an auxiliary operating rod 45 terminating with an end plate 46 and having an intermediate ring 47 that limits inward movement by abutting against the body portion 12'.

The actuator 21 is a uni-directionally operated ejector-retractor mechanism of the type employed in conventional ball point pens. Thus, the valve stem 41 is alternately ejected from and retracted into the stationary body 35 in response to sequential inward movements of the operator rod 42 produced by corresponding movements of the auxiliary rod 45. The specific details of the actuator mechanism 21 do not, per se, form a part of the invention, and are therefore, not described in detail. However, uni-directionally operated mechanism suitable for use in the invention are shown and disclosed in U.S. Pat. Nos. 2,930,355 and 3,051,132.

In a preferred application, the valve 11 is mounted in a cabinet (not shown) with the operator plate 46 projecting therefrom at about average thigh level. The outlet opening 16 is connected by a tubulation 50 with an associated discharge nozzle 51 positioned above a sink (not shown) supported by the cabinet. Another tubulation 52 between the inlet opening 15 and the outlet of a conventional thermistatically controlled mixing valve 53. Inlets 54 and 55 of the mixing valve 53 are connected, respectively, to sources of hot and cold water so as to provide water of a desired temperature at the inlet opening 15 of the on-off valve 11.

In the off position illustrated in FIG. 1, the internal valve chamber 25 is filled with water at inlet pressure through the orifice 57 in the outer diaphragm portion 26. Because the area of the diaphragm 22 subjected to the fluid pressure in chamber 25 is greater than the annular diaphragm area subjected to the water pressure at inlet opening 15, there is produced a net force tending to seat the mid-diaphragm portion 27 against the valve seat 19. This seating force aided by the compression spring member 33 maintains a fluid-tight seating engagement and prevents the flow of water between the inlet opening 15 and the outlet opening 16.

To initiate water flow, the operator plate 46 is engaged by a user's thigh and pushed inwardly. The resultant inward movement of the actuator rod 42 retracts the valve stem 41 and opens the orifice 28 as illustrated in FIG. 2. Because the diameter of orifice 28 is greater than that of orifice 57, a net discharge of water occurs reducing the fluid pressure in the internal chamber 25. The force exerted on outer diaphragm portion 26 by the water pressure at inlet 15 is then greater than the combined opposition forces exerted by the compression spring and the fluid pressure in chamber 25. Consequently, the head assembly 18 is forced away from the valve seat 19, as shown in FIG. 2, providing a fluid communication path between the inlet and outlet openings 15 and 16 through the open passages 17. Water from the mixing valve 53 is accordingly discharged by the nozzle 51. An orifice 61 in the retaining cylinder 36 insures the existence of a fluid flow path between the chamber 25 and orifice 28 with the valve open.

A subsequent inward movement of the auxiliary operating rod 45 produced by again pushing on the operator plate 46 causes the actuator assembly 21 to eject the valve stem 41 back into the position shown in FIG. 1. This seals the orifice 28 and allows a fluid pressure buildup in the chamber 25 through the outer orifice 57. When the force produced by this internal chamber pressure together with that exerted by the compression spring 33 become greater than the force exerted on the diaphragm 22 by the inlet water pressure, the head assembly 22 is again forced into seating engagement with the valve seat 19. This seals the passages 17 and terminates water flow to the nozzle 51.

Thus, the valve 11 is effective to either provide or prevent water flow in response to sequential uni-directional operator 45 movements readily produced by portions of the human anatomy other than the hand. In addition, the use of the valve 11 in combination with the mixing valve 53 provides in a simple arrangement, a controlled supply of water at a desired temperature. Such a system is uniquely suited for use in the above-noted hand washing facilities of hospitals and clinics. However, it will be apparent that the valve 11 also can be used in other applications wherein a controlled supply of fluid is required by persons either without hands or with hands occupied by other functions. Various examples of such applications exist in kitchen and washing facilities of both commercial and private enterprises.

Because the primary force used to move the head assembly 18 is provided by the available inlet water pressure, the force required to operate the actuating mechanism 21 is relatively small. This is significant in that it both simplifies valve actuation by a user and reduces the structural requirements of the relatively intricate actuator assembly 21. In addition, operating tolerances required of the actuating mechanism 21 are reduced by the illustrated arrangement wherein the uniform cross-sectioned valve stem portion 44 projects through the O-ring gasket 31 to seal the orifice 28. Because of its uniform cross section, a tight seal can be created between any longitudinal portion of the valve stem portion 44 and the O-ring gasket 31. Thus, the relative positioning between the valve stem portion 44 and the head assembly 18 required to seal the orifice 28 is not critical and the backlash exhibited by typical ejector-retractor mechanisms presents no problem.

Obviously, many modifications and variations of the present invention are possible in light of the above teachings. For example only, the uni-directional actuator feature also could be used to selectively regulate fluid flow rates through an associated valve member. It is to be understood, therefore, that the invention can be practiced otherwise than as specifically described.

What is claimed is:

1. A valve apparatus comprising:

a valve body having inlet and outlet openings joined by a fluid flow passage, said valve body defining an internal valve chamber;

a valve seat located in said fluid flow passage;

a valve head operatively associated with said valve seat and adapted for controlled movement that alters fluid conductance through said passage;

seal means that isolates said internal valve chamber from both said inlet and outlet openings, said seal means defining an outer orifice providing limited fluid communication between said inlet opening and said internal valve chamber and an inner orifice providing limited fluid communication between said outlet opening and said internal chamber, said inner orifice providing greater conductance than said outer orifice;

a valve actuator for actuating said valve head, said valve actuator comprising an operator adapted for reciprocal movement, and wherein said actuator first actuates said valve head to reduce fluid conductance through said passage and then actuates said valve head to increase fluid conductance through said passage in response to sequential movements of said operator in a given direction, said valve actuator comprising a valve stem that is moved to alternately open and close said inner orifice in response to said sequential movements of said operator in a given direction and said valve stem comprises an elongated portion of substantially uniform cross section that projects into and seals said inner orifice in response to said other alternate movements of said operator in said given direction, the cross-sectional dimensions of said elongated portion being substantially equal and corresponding to the minimum cross-sectional dimensions of said inner orifice.

2. A valve apparatus according to claim 1 wherein said operator is adapted to be pushed in said given direction.

3. A valve apparatus according to claim 1 wherein said valve actuator comprises bias means that exerts a force on said operator in a direction opposite to said given direction and returns said operator to a neutral position after a predetermined number of actuating movements thereof in said given direction.

4. A valve apparatus according to claim 3 wherein said valve head is adapted to be seated on said valve seat to close said passage in response to alternate movements of said operator in said given direction and to be unseated from said valve seat to open said passage in response to the other alternate movements of said operator in said given direction.

5. A valve apparatus according to claim 1 wherein said valve head comprises diaphragm means having a face with an inner portion adapted to seal said outlet opening from said internal valve chamber, an outer portion adapted to seal said inlet opening from said internal valve chamber, and an annular seating portion straddled by said inner and outer portions and adapted to seat on said valve seat.

6. A valve apparatus according to claim 5 wherein said outer portion defines said outer orifice providing fluid communication between said inlet opening and said internal valve chamber, and said inner portion defines said inner orifice with higher conductance than said outer orifice and providing fluid communication between said outlet opening and said internal valve chamber.

7. A valve apparatus according to claim 1 wherein said valve head comprises an O-ring gasket positioned in and defining the minimum cross-sectional dimensions of said inner orifice.

* * * * *